United States Patent Office 3,180,793
Patented Apr. 27, 1965

3,180,793
INSECT STERILIZING PROCESS
Rudi F. W. Rätz, Hamden, Conn., assignor to Olin Mathieson Chemical Corporation, New Haven, Conn., a corporation of Virginia
No Drawing. Filed Sept. 26, 1963, Ser. No. 311,643
4 Claims. (Cl. 167—33)

This invention relates to a series of insect sterilant compositions and to methods of sterilizing harmful insects. This application is a continuation-in-part of my copending application Serial No. 188,948, filed April 20, 1962, which is now U.S. Patent 3,138,585.

It has been found that a series of heretofore unknown bis-3,9-(1-aziridinyl)-2,4,8,10 - tetraoxa - 3,9 - diphosphaspiro[5.5]undecane compounds possess unusual biological characteristics and are particularly effective chemosterilants in the controlling of harmful insects. These chemosterilants have the following general formula:

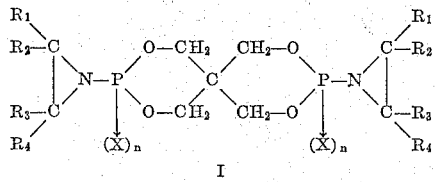

I wherein $R_1$, $R_2$, $R_3$, and $R_4$ are selected from the class consisting of hydrogen, alkyl, e.g. methyl, ethyl, propyl, butyl, and aryl, e.g. phenyl, and X is selected from the group consisting of oxygen, sulfur and selenium, and $n$ is an integer of from 0–1.

Most of the compounds having the Formula I can be readily prepared in high purity by the reaction of ethylenimine and its homologs with 3,9-dichloro-2,4,8,10-tetraoxa-3,9-diphosphaspiro[5.5]undecane and the corresponding 3,9-dioxide as described in the aforementioned copending application. The preferred ethylenimines which are suitable for use in this invention are ethylenimine and 2-methyl-ethylenimine. However, other ethylenimines can be used to prepare compounds included in the general Formula I. For example, 2,2-dimethyl-ethylenimine, 2 - phenyl - ethylenimine, 2,3-dimethyl-ethylenimine, 2,3-diphenyl-ethylenimine, 2,2,3-triethyl-ethylenimine, and 2,2-diethyl-3-n-propyl-ethylenimine can also be utilized.

Reference should be made to the following examples to illustrate typical preparations of the chemosterilants.

Example 1

Into a 500 ml. three-necked flask equipped with stirrer, dropping funnel and condenser was placed 14.5 g. of 3,9-dichloro-2,4,8,10-tetraoxa - 3,9 - diphosphaspiro[5.5]undecane which was suspended in 250 ml. of anhydrous ether. The reaction flask was immersed in an ice water bath, and 12.5 g. of triethylamine was added to the reaction flask. Then 6.5 g. of ethylenimine dissolved in 50 ml. of ether was added dropwise with stirring over a 30 minute period to the reaction flask. Stirring was continued for one hour longer with cooling and then for one additional hour at room temperature.

At this point, a considerable amount of solid material, mostly triethylamine hydrochloride, had separated from the reaction mixture. An additional 150 ml. of anhydrous ether was added as a diluent to the reaction flask before the solid was filtered. The dried filtered material weighed 22.3 g., and this material after washing twice with distilled water was reduced to 4.0 g. of a water-insoluble chlorine free colorless crystallized product. The residual ethereal filtrate was distilled to dryness in vacuo, and the remaining solid material was washed twice with cold ethanol. Another 4 g. of water-insoluble chlorine-free crystalline material was obtained making a total of 8 g. of such material. This represented a 53% yield of bis - 3,9 - (1 - aziridinyl) - 2,4,8,10 - tetraoxa - 3,9 - diphosphaspiro[5.5]undecane. Attempts to recrystallize this material from common solvents were unsuccessful. The melting point could not be determined by heating a sample on a Fisher-Johns block at the usual rate since the product suffers self-polymerization under such conditions. By using a preheated Fisher-Johns plate, 172–174° C. was the lowest temperature at which upon slight pressure on the upper cover glass a clear melt was obtained. Upon further heating however, this melt was transformed very rapidly into a colorless polymeric material with strong adhesion to the glass covers.

*Analysis.*—Calcd. for $C_9H_{16}N_2O_4P_2 \cdot H_2O$: C, 36.50; H, 6.09; N, 9.46; P, 20.9. Found: C, 36.84, 36.90; H, 6.01, 6.03; N, 9.18, 9.12; P, 20.4.

Example 2

A solution of 10 g. of 3,9-dichloro-2,4,8,10-tetraoxa-3,9-diphosphaspiro[5.5]undecane-3,9-dioxide in 70 ml. of anhydrous cold dimethylacetamide was prepared and placed in a 250 ml. three-necked flask equipped with stirrer, dropping funnel and condenser. The flask was immersed in an ice water bath, and ethylenimine (7 g., 0.166 mole) was added dropwise to the flask with stirring over a twenty minute period. Separation of colorless crystals from the clear reaction mixture began approximately 30 minutes after the amine addition had been completed. After one additional hour of stirring at room temperature, the crystalline reaction product was collected on a Büchner funnel. After the crystalline product was recrystallized from absolute ethanol, shining colorless needles were obtained in an amount of 7 g. (67%). The material showed the same melting point characteristics as the product of Example 1, and on a preheated Fisher-Johns plate melting was observed at 278° C. followed by self-polymerization.

Analytical data indicated that the desired bis-3,9-(1-aziridinyl)-2,4,8,10 - tetraoxa - 3,9 - diphosphaspiro[5.5]-undecane-3,9-dioxide had been obtained after one recrystallization in high purity.

*Analysis.*—Calcd. for $C_9H_{16}N_2O_6P_2$: C, 34.85; H, 5.16; N, 9.04; P, 19.97. Found: C, 35.08, 35.12; H, 5.49, 5.43; N, 9.05, 9.26; P, 19.70.

Example 3

Into a 250 ml. three-necked flask equipped with stirrer, condenser and gas inlet tubes was placed 200 ml. of anhydrous chloroform. The chloroform was saturated with ammonia gas at 0° C. Then 5.0 g. of 2-methyl-ethylenimine was charged into the reaction flask, and 11.2 g. of 3,9-dichloro - 2,4,8,10 - tetraoxa - 3,9 - diphosphaspiro-[5.5]undecane-3,9-dioxide (which had been recrystallized from glacial acetic acid) was added with stirring in 10 equal portions over a period of 50 minutes. After this addition was completed, the mixture was stirred for two additional hours at 0° C. and then allowed to stand at room temperature overnight. A chloroform insoluble material was removed from the reaction mixture by filtration, and this completely water-soluble material amounted to 8.2 g. and contained a theoretical amount of ammonium chloride (4.05 g.) in addition to some phosphorus-containing reaction product. The chloroform filtrate was then evaporated to dryness in vacuo at 40° C. leaving 8.5 g. of a colorless solid residue which was readily water-soluble and chlorine-free. This product was washed with ether and a free-flowing powder was obtained which was dissolved in boiling ethyl acetate. After cooling and filtration, the filtrate was evaporated to dryness leaving 6.0 g. (78.5% yield) of a colorless material. This material was recrystallized from carbon tetrachloride resulting in colorless needles having a melting point of 165-166° C. Additional reaction product was obtained by extraction with cold ethanol or with refluxing carbon tetrachloride of the chloroform-insoluble portion.

Analytical data confirmed that bis-3,9-[1-(2-methylaziridinyl)]-2,4,8,10-tetraoxa - 3,9 - diphosphaspiro[5.5]-undecane-3,9-dioxide had been obtained in high purity.

*Analysis.*—Calcd. for $C_{11}H_{20}N_2P_2O_6$: C, 39.03; H, 6.18; N, 8.44. Found: C, 39.22, 38.99; H, 600, 6.13; N, 8.30.

Other compounds included in the general Formula I can be prepared by the reaction of sulfur and selenium with the bis(1-aziridinyl) derivatives prepared from the starting reactant, 3,9 - dichloro-2,4,8,10-tetraoxa-3,9-diphosphaspiro[5.5]undecane. For instance, the following example will serve to illustrate the preparation of a compound of this type.

*Example 4*

A solution of 0.1 g. of flower of sulfur dissolved in 5 ml. of carbon disulfide was placed in a small reaction flask. A filtered solution of 0.436 g. of bis-3,9-(1-aziridinyl)-2,4,8,10-tetraoxa - 3,9 - diphosphaspiro[5.5]undecane in 30 ml. of carbon disulfide was added to the reaction flask, and the mixture was allowed to stand. After 4 days an amount of 0.25 g. faintly yellowish crystals was obtained from the solution by filtration. Attempts to obtain a melting point on a Fisher-Johns plate beginning from room temperature were unsuccessful and at about 290° C. decomposition occurred. However, on a preheated Fisher-Johns plate the solid melted at 220°-223° C. upon slight pressure of the upper cover glass.

Analysis indicated that the product was the desired bis-3,9-(1-aziridinyl)-2,4,8,10-tetraoxa - 3,9 - diphosphaspiro-[5.5]undecane-3,9-disulfide.

*Analysis.*—Calcd. for $C_9H_{16}N_2S_2O_4P_2$: C, 31.58; H, 4.68; N, 8.20; P, 18.10. Found: C, 31.45; H, 4.54; N, 8.81; P, 17.6.

An mentioned in the preceding discussion, the organic phosphorus compounds (I) are potent insect sterilizing agents. They are applied by contacting the insects with an amount of the chemosterilant sufficient to exert a sterilizing action. As used in the specification and claims herein, it is to be understood that contacting the insects with the chemosterilant includes both administering the sterilizing ingredient to the insects in the form of food or by topically applying the active ingredient to the insects.

Although the compounds of this invention can be used alone as chemosterilants, it is more practical to utilize them in a dispersed form admixed with a major amount of a suitable carrier or extending agent. A variety of insect sterilant compositions can be prepared containing these compounds as the principal active ingredient.

The term "dispersed" as used herein is used in a broad sense. When it is said that the chemosterilants having the Formula I are dispersed, it means that the particles may be molecular in size and held in true solution in a suitable solvent. It means further that the particle may be colloidal in size and dispersed through a liquid phase in the form of suspension or emulsions or in the form of particles held in suspension by wetting agents. The compounds may also be dispersed and admixed in solid carriers so as to form powders, dusts or granular preparations.

The term "extending agent" as used in this specification and claims includes any and all of those carriers or diluents in which the compounds of this invention are dispersed. For example, it includes the solvents of a true solution, the liquid phase of suspensions and emulsions and the solid carriers of a powder or dust.

Thus, the organic phosphorus compounds (I) may be combined with a variety of diluents or carriers to provide useful insect sterilant compositions.

For example, the chemosterilants of this invention can be formulated with various carriers to form "baits" which when fed to harmful insects prove to be excellent insect sterilant compositions. The following procedure will serve to illustrate how the compounds of this invention can be formulated into baits suitable for sterilizing insects.

A solution of 0.5 g. of bis-3,9-(1-aziridinyl)-2,4,8,10-tetraoxa - 3,9 - diphosphaspiro[5.5]undecane - 3,9 - dioxide in 50 ml. of chloroform was prepared. This solution was blended with 100 g. of granulated sucrose, and after a thorough mixing of the solution with the sucrose, the solvent was evaporated. The residual solid material was ground in a mortar. This bait was fed to twenty-four hour old houseflies for a period of five days. On the succeeding two days, eggs were collected from a prepared oviposition site and incubated for 24 hours at 75° F. These eggs were then inspected under a binocular microscope for "hatching." All "unhatched" eggs are considered non-viable or sterile, and the data was recorded as percent sterile eggs. Under the conditions of this procedure, 96% of the eggs were non-viable. It has been found that a good sterilant should cause about 85% sterility at 0.5% concentration.

A number of other carriers may be employed as extending agents in baits in addition to the sugar carriers described above. Examples of other carriers include corn grits, limestone, pumice, corn cob grits of varying particle sizes, walnut shell aggregate, a mixture of powdered eggs-powdered milk-sucrose, talc, Pyrax granules, concrete sand, etc. When the carrier is not sugar, it is advantageous to add about 5 to 50% by weight of sugar to the carrier as a lure.

The compounds of the Formula I can also be admixed with a major amount of various solid extending agents to provide pest sterilant formulations which can be applied as powders or dusts. Dry extenders suitable for such use include kaolin, calcium carbonate, talc, Barden's clay, Attapulgus clay and others. These insect sterilant compositions may be utilized in the dry form or, if so desired, a wetting agent may be used to prepare wettable powders.

The chemosterilants of this invention may also be used to combat harmful insects in the form of emulsions. These emulsions can be prepared by dissolving the active ingredient in a solvent which is not miscible with water, and adding water to the solution in the presence of an emulsifying agent. Emulsion formulations of this nature can be readily sprayed in desired locations.

Many of the chemosterilants (I) are soluble in water especially those containing aziridinyl rings free of alkyl substituents or those having only methyl substituents on said rings. Thus, an insect sterilant composition particularly suitable for spraying operations was prepared by dissolving bis-3,9-[1-(2-methylaziridinyl)]-2,4,8,10-tetraoxa - 3,9 - diphosphaspiro[5.5]undecane-3,9-dioxide in water to provide a 0.5% solution of the active ingredient. This solution was then sprayed on houseflies confined in a small cage. The flies were left in this cage for one hour before they were transferred to a larger cage and fed milk. Subsequently, eggs were collected from a prepared oviposition site in the cage and incubated for 24 hours at 75° F. These eggs were inspected under a microscope for hatching, and a high percentage of the eggs examined were found to be non-viable.

However, some of the chemosterilants described herein are water-insoluble, such as the compounds included in the Formula I wherein phenyl substituents are attached to the aziridinyl rings. Therefore, water can be utilized as a carrier for these compounds to provide useful suspension formulations. Although it is not necessary, a surface active agent can be advantageously employed in these formulations to provide fine colloidal suspensions which are particularly adaptable for spraying operations.

Of course, the organic phosphorus compounds (I) can also be dissolved in various organic solvents, and the resulting solutions employed as sprays. Suitable solvents include acetone, chlorinated hydrocarbons such as chloroform, etc., dimethylacetamide, dimethylformamide and others.

The chemosterilants described herein may be used in the control of a wide variety of harmful insects including houseflies, latrine flies, the screw worm fly, the stable fly, vinegar fly, the Mediterranean fruit fly, the Mexican fruit fly, the Oriental fruit fly, the boll weevil, eye gnats, and others. They may also be used in sterilizing composition applicable in the control of the malarial mosquito.

Obviously, the chemosterilants are more potent if utilized in concentrated form. However, as a practical matter, it is preferred to utilize them in compositions wherein not more than about one percent of active ingredient is present. One of the features associated with the use of these chemosterilants, in fact, is that they are effective in sterilizing insects even when used in concentrations of about 0.01% and even lower in some cases.

What is claimed is:

1. A method for the sterilization of insects which comprises contacting said insects with an amount sufficient to exert a sterilizing action of a compound having the formula

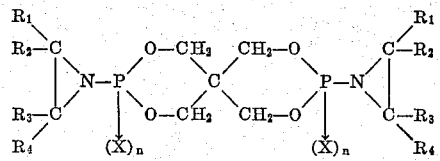

wherein $R_1$, $R_2$, $R_3$, and $R_4$ are selected from the class consisting of hydrogen, alkyl having 1 to 4 carbon atoms and phenyl; wherein X is selected from the class consisting of oxygen, sulfur and selenium, and $n$ is an integer of 0-1.

2. A method for the sterilization of insects which comprises contacting said insects with an amount sufficient to exert a sterilizing action of bis-3,9-(1-aziridinyl)-2,4,8,10-tetraoxa-3,9-diphosphaspiro[5.5]undecane.

3. A method for the sterilization of insects which comprises contacting said insects with an amount sufficient to exert a sterilizing action of bis-3,9-(1-aziridinyl)-2,4,8,10-tetraoxa-3,9-diphosphaspiro[5.5]undecane-3,9-dioxide.

4. A method for the sterilization of insects which comprises contacting said insects with an amount sufficient to exert a sterilizing action of bis-3,9-[1-(2-methylaziridinyl)]-2,4,8,10-tetraoxa-3,9-diphosphaspiro[5.5]undecane-3,9-dioxide.

References Cited by the Examiner
UNITED STATES PATENTS
3,138,585  6/64  Rätz ------------------ 167—33

JULIAN S. LEVITT, *Primary Examiner.*